United States Patent
Egner et al.

(10) Patent No.: US 9,510,357 B1
(45) Date of Patent: Nov. 29, 2016

(54) METHOD AND APPARATUS FOR OPTIMIZING END TO END RADIO COMMUNICATION MANAGEMENT FOR USERS WITH MULTIPLE DEVICES

(71) Applicant: Dell Products, LP, Round Rock, TX (US)

(72) Inventors: Will A. Egner, Cedar Park, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/820,387

(22) Filed: Aug. 6, 2015

(51) Int. Cl.
H04W 4/00 (2009.01)
H04W 72/08 (2009.01)
H04W 48/18 (2009.01)

(52) U.S. Cl.
CPC ........... H04W 72/085 (2013.01); H04W 4/003 (2013.01); H04W 48/18 (2013.01)

(58) Field of Classification Search
CPC .............................. H04W 4/003; H04W 48/18
USPC ......... 455/452.2, 445, 446, 512, 514, 452.1, 455/509
See application file for complete search history.

(56) References Cited

U.S. PATENT DOCUMENTS

| | | | |
|---|---|---|---|
| 7,013,145 B1 | 3/2006 | Centore, III | |
| 8,666,048 B2 | 3/2014 | Beerse et al. | |
| 9,088,859 B2 | 7/2015 | Egner et al. | |
| 9,171,322 B2 * | 10/2015 | Spievak ............. | G06Q 30/0275 |
| 2004/0192341 A1 | 9/2004 | Wang et al. | |
| 2005/0041696 A1 | 2/2005 | Pekonen | |
| 2006/0268849 A1 | 11/2006 | Larsson et al. | |
| 2007/0060130 A1 | 3/2007 | Gogic et al. | |
| 2009/0181695 A1 | 7/2009 | Wirola et al. | |
| 2009/0279502 A1 | 11/2009 | Zheng et al. | |
| 2009/0319348 A1 | 12/2009 | Khosravy et al. | |
| 2009/0323632 A1 * | 12/2009 | Nix ........................ | H04L 29/125 370/331 |
| 2010/0202376 A1 | 8/2010 | Zhu et al. | |
| 2010/0220665 A1 | 9/2010 | Govindan et al. | |
| 2011/0143761 A1 | 6/2011 | Uusitalo et al. | |
| 2012/0057569 A1 | 3/2012 | Xie et al. | |
| 2013/0023274 A1 | 1/2013 | Meredith et al. | |
| 2013/0065592 A1 * | 3/2013 | Zinser ................... | H04W 36/30 455/436 |
| 2015/0056960 A1 * | 2/2015 | Egner ................... | H04W 12/08 455/411 |

OTHER PUBLICATIONS

"Policy control and charging for LTE Networks whitepaper," P. Mottishaw, Analysys Mason Ltd. Oct. 2009, pp. 1-20.

\* cited by examiner

*Primary Examiner* — John J Lee

(74) *Attorney, Agent, or Firm* — Prol Intellectual Property Law, PLLC; H. Kenneth Prol

(57) ABSTRACT

A method includes receiving wireless communication device usage trend data for a plurality of available wireless communication devices associated with a recipient and detecting, via an application processor executing instructions for a pan device communication optimization agent, a plurality communication paths with the plurality of wireless communication devices associated with the recipient. The method further includes an end-to-end quality score for a wireless communication device associated with the user, wherein the end-to-end quality score is based on selection of a communication type, wireless communication device usage trend data, wireless link quality for available communication paths with the wireless communication devices associated with the recipient and selecting at least one preferred communication path between the wireless communication device associated with the user and at least one wireless communication device associated with the recipient based on comparison of end-to-end scores.

20 Claims, 7 Drawing Sheets

METHOD AND APPARATUS FOR OPTIMIZING END TO END RADIO COMMUNICATION MANAGEMENT FOR USERS WITH MULTIPLE DEVICES

CROSS REFERENCE TO RELATED APPLICATIONS

Related subject matter is contained in the following co-pending applications:

U.S. patent application Ser. No. 13/604,906, entitled "Method and Apparatus for Connection Context Aware Radio Communication Management," filed on Sep. 6, 2012, and soon to issue as U.S. Pat. No. 9,088,859, the disclosure of which is hereby expressly incorporated by reference in its entirety.

U.S. application Ser. No. 14/099,698, entitled "Method and Apparatus for Predicting Mobile Device Wireless Link Quality of Service Requirements Along a Predicted Path," filed on Dec. 6, 2013, the disclosure of which is hereby expressly incorporated by reference in its entirety.

U.S. application Ser. No. 14/099,715, entitled "Method and Apparatus for Determining Optimized Wireless Link Selection for a Mobile Device Along a Predicted Path," filed on Dec. 6, 2013, the disclosure of which is hereby expressly incorporated by reference in its entirety.

FIELD OF THE DISCLOSURE

The present disclosure generally relates to a method and apparatus for a radio resources communication management system to adapt to context and usage of communication channels in relation to users having a plurality of available radiofrequency communication devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. Users may choose from among several available radiofrequency communication platforms in information handling systems for data and other communications with other users via communication and data networks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Figure 1:
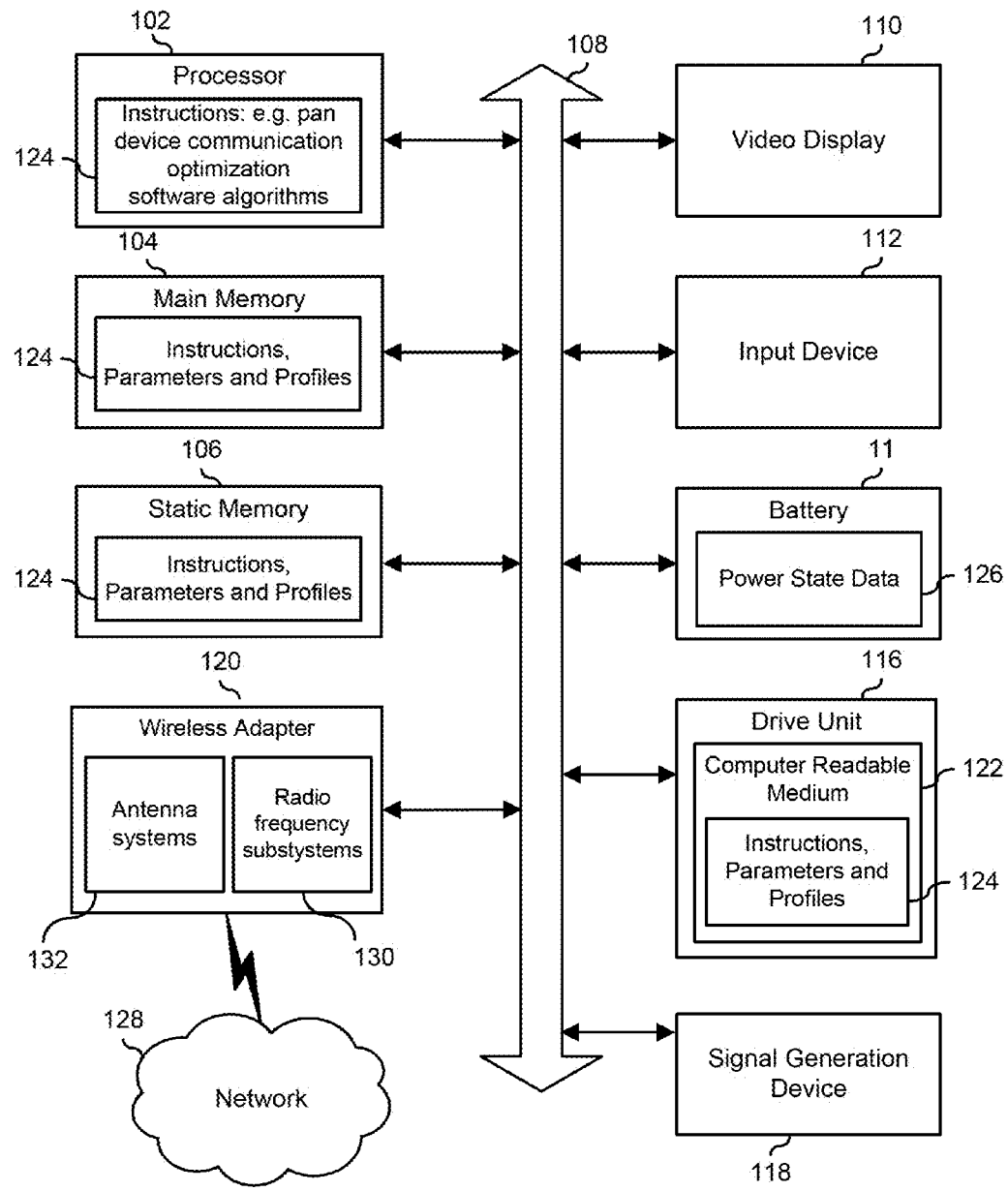
FIG. 1 is a block diagram illustrating an information handling system according to an embodiment of the present disclosure.

FIG. 1 shows an information handling system 100 capable of administering each of the specific embodiments of the present disclosure. The information handling system 100 can represent the wireless communication devices 210, 220, and 230 or servers or systems 290 located anywhere within network 200 of FIG. 2, including the remote data center 286 operating the virtual machine applications described herein. Information handling system 100 may represent a wireless communication device associated with a user or recipient of intended wireless communication. A wireless communication device may execute instructions via a processor for pan device communication optimization system according to embodiments disclosed herein, including a pan device communication optimization system software agent. Information handling system 100 may also represent a networked server or other system and administer aspects of the pan device communication optimization system via instructions executed on a processor according to various embodiments herein, including a pan device communication optimization system manager. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Display 110 may include a touchscreen display module and touchscreen controller (not shown) for receiving user inputs to the information handling system 100. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, or a mobile smartphone.

The information handling system 100 can include a set of instructions 124 that can be executed to cause the computer system to perform any one or more of the methods or computer based functions disclosed herein. For example, instructions 124 may execute pan device communication optimization system, including pan device communication optimization system software agents, the pan device communication optimization system manager, or other aspects or components. Similarly instructions 124 may be execute the context aware radio resource management system disclosed herein for monitoring wireless links and resources. Various software modules comprising application instructions 124 may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of wireless communication device usage trends by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or subsystems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the pan device communication optimization system software algorithms may be stored here. Additionally, wireless communication device usage trend data for the pan device communication optimization system and wireless link profiles relating to context aware radio resource management system may be stored here. Wireless link profiles stored here may include end-user profile data measured by the processor 102 during wireless link usage. Profiles may additionally include crowd sourced spatial-temporal radio frequency profiles for wireless links or for energy link consumption data. In a particular embodiment, the instructions, parameters, and profiles 124 may reside completely, or at least partially, within the main memory 104, the static memory 106, and/or within the disk drive 116 during execution by the processor 102 of information handling system 100. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, wireless controller circuitry, amplifiers and other circuitry for wireless communications. Each radiofrequency subsystem 130 may communicate with one or more wireless technology protocols. The radiofrequency subsystem 130 may contain individual subscriber identity module (SIM) profiles for each technology service provider and their available protocols. Alternatively it may have a software based SIM profile that is reconfigurable. The wireless adapter 120 may also include antenna system 132 which may be tunable antenna systems for use with the system and methods disclosed herein.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G or the like from one or more service providers. The wireless adapter 120 can represent a add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for Wi-Fi or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may measure various metrics relating to wireless communication pursuant to operation of a context aware radio resource management system as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller may manage one or more radio frequency subsystems 130 within a wireless adapter 120. The wireless controller also manages transmission power levels which directly affect radio frequency subsystem power consumption. To detect and measure power consumption by a radio frequency subsystem 130, the radio frequency subsystem 130 may implement current and voltage measurements of power that is directed to operate a radio frequency subsystem. The voltage and current provides power measurement in milliwatts. Energy consumed may be calculated from sample measurements by taking average power measured over a duration of transmission. In an alternative embodiment of power measurement, counter registers may be used to estimate power consumed during transmissions. Energy measurement may be a sampled during a count cycle. In this case, a sample energy measurement per count is multiplied into a count for operation of a radio subsystem. In this way, power consumption may be estimated in an example embodiment.

The wireless network may have a wireless mesh architecture in accordance with mesh networks described by the wireless data communications standards or similar standards. The wireless adapter 120 may also connect to the external network via a WPAN, WLAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
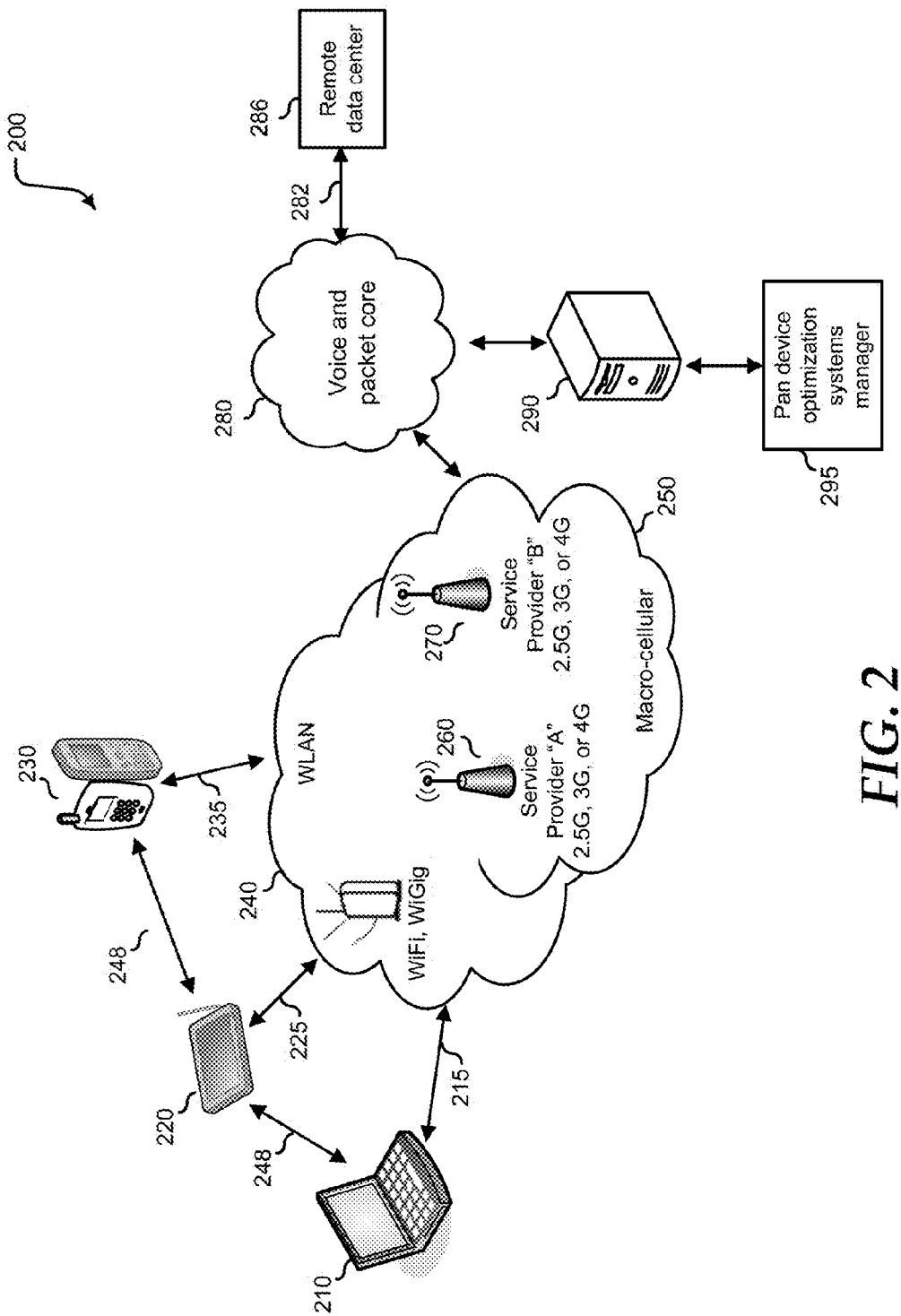
FIG. 2 is a block diagram of a network environment offering several communication protocol options and wireless communication devices according to an embodiment of the present disclosure.

FIG. 2 illustrates a network 200 that can include one or more information handling systems. In a particular embodiment, network 200 includes networked wireless communication devices 210, 220, and 230, wireless network access points, and multiple wireless connection link options. A variety of additional computing resources of network 200 may include client mobile information handling systems, data processing servers 290, network storage devices, local and wide area networks, or other resources as needed or desired. As specifically depicted, systems 210, 220, and 230 may be a laptop computer, tablet computer, or smartphone device. These wireless communication devices 210, 220, and 230, may access a wireless local area network 240, or they may access a macro-cellular network 250. For example, the wireless local area network 240 may be the wireless local area network (WLAN), a wireless personal area network (WPAN), or a wireless wide area network (WWAN). Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11 ad WiGig, IEEE 802.15 WPAN or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional wireless communication devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In an example embodiment, the cloud or remote data center 286 or networked server 290 may run hosted applications for systems 210, 220, and 230. For example, remote data center 286, networked server 290, or some combination of both may operate some or all of a pan device communication optimization system as disclosed in the present disclosure. This may occur by establishing a virtual machine application executing software to manage applications hosted at the remote data center 286 in an example embodiment. Wireless communication devices 210, 220, and 230 are adapted to run one or more applications locally, and to have hosted applications run in association with the local applications at remote data center 286 or networked server 290. For example, wireless communication devices 210, 220, and 230 may operate a pan device communication optimization system software agent in some embodiments. The virtual machine application may serve one or more applications to each of wireless communication device 210, 220, and 230. Thus, as illustrated, systems 210, 220, and 230 may be running applications locally while requesting data objects related to those applications from the remote data center 286 via wireless network. In another example, an electronic mail client application may run locally at system 210. The electronic mail client application may be associated with a host application that represents an electronic mail server. In another example, a data storage client application such as Microsoft Sharepoint may run on system 220. It may be associated with a host application running at remote data center 286 that represents a Sharepoint data storage server. In a further example, a web browser application may be operating at system 230. The web browser application may request web data from a host application that represents a hosted website and associated applications running at remote data center 286.

Although 215, 225, and 235 are shown connecting wireless adapters of wireless communication devices 210, 220, and 230 to wireless networks 240 or 250, actual wireless communication may link through a wireless access point or though a service provider tower such as that shown with service provider A 260 or service provider B 270. Since one aspect of the disclosed embodiments involves assessment and selection of wireless links by a pan device communication optimization system using a context aware radio resource management system, no particular wireless link selection is depicted in FIG. 2.

The connection quality of service (QOS) and speed of wireless links 215, 225, and 235 may vary widely depending on several factors including the service provider bandwidth, the number of wireless communication devices and users in a location, and other factors. Quality of service impacts energy consumption and efficiency of a wireless communication device communicating wirelessly. Thus, selection of a wireless link may depend on assessment of the link radio frequency conditions. Assessment of link radio frequency conditions may be made via a context aware radio resource management system and a link rating developed for links. Radio frequency conditions for wireless links will evolve over time. Differences in wireless link QOS or efficiency will also vary minute-by-minute, hourly, daily, weekly or monthly or during even longer periods. Thus, assessment may need to be regular.

Wireless link conditions will vary depending on the type of service likely to be requested by the mobile information handling system. For example, voice communication may be most efficient on a 2G wireless protocol. Voice communication on 4G may be more costly in terms of time required for authentication and connectivity negotiation or in terms of transmission power requirements. Data services relating to messaging and SMTP email may have the lowest power cost on 2.5G protocols due to the simplest access barriers there. Higher level data services requiring greater wireless bandwidth may more efficiently use recently implemented protocols. For example, audio streaming may be optimal for 3G protocols. Video streaming and HTTP web browsing may be best suited to 4G protocols and much less efficient at lower protocols which are not designed to accommodate large data throughput.

As the protocols become more advanced, additional registration and initialization for data becomes costly from a processing and power consumption standpoint. This is balanced against the capabilities of the more advanced protocols to handle data transfers. More complicated communication protocols result in greater processing time and authentication/connection message exchange. More robust processor or controller operation and longer delays for transmitter or receiver circuits consume power. On the other hand, certain protocol advancements are designed to make data transfers quicker and more efficient. Thus for example, the 4G protocol may generally consume more power during operation than 2.5G for voice communications, but less power for high volume data transfers.

For this reason, the wireless communication device operating context can play an important role in determining wireless link conditions and efficiency from a power consumption standpoint. Information about wireless link connection quality and capacity for a service to be used can be advantageous in optimizing communication channel selection. In most cases, transmission or reception via a macro-cellular network 250 base station at a service provider 260 or 270 will take more power than communication via WLAN such as Wi-Fi. Among macro-cellular systems, energy consumption generally, but not in all circumstances, increases at each advancement of technology protocol from 2G to 4G. Plus, increased traffic levels on an advanced macro-cellular protocol may slow down in comparison to an older technology with less active traffic. Additional future macro-cellular protocols are contemplated as well. Those protocols may require additional energy demands of mobile information handling systems. Additionally, often the QoS of an end-to-end wireless communication path between wireless communication devices of a user and a recipient will most directly be affected the the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. As described above, these factors can be specific to the type of wireless service being requested, whether voice, messaging, SMTP, Audio, Video, HTTP or other service types. It can also be specific to the wireless communication device used. Certain protocols may not be available on some mobile information handling systems. In each instance, radio frequency transmission subsystems and controllers operate and consume device power. Based on these numerous factors, the system of the present embodiment may automatically switch between radio network technologies or service providers to optimize radio frequency conditions, traffic conditions, device power consumption, cost, or any of the above. Selection of a wireless service provider and technology protocol may generally depend on the optimal wireless technology used for a service requested, the radio frequency conditions of a link, traffic conditions for the wireless link, and availability of a link.

A context aware radio resource management system may maintain RF traffic reports relating to wireless links at a database. That database may be located within the wireless network for example at remote data center 186. RF traffic report database aggregates wireless link QoS data across the wireless network and with respect to wireless communication devices operating with the pan device communication optimization system of the present disclosure. The RF traffic report database of the context aware radio resources system maintains performance data of service providers and various wireless protocols available for parts of a wireless communication path. The aggregated RF traffic report database may be accumulated or crowd sourced from multiple wireless communication devices operating on a given network or networks. This feature will be described further below.

Figure 3:
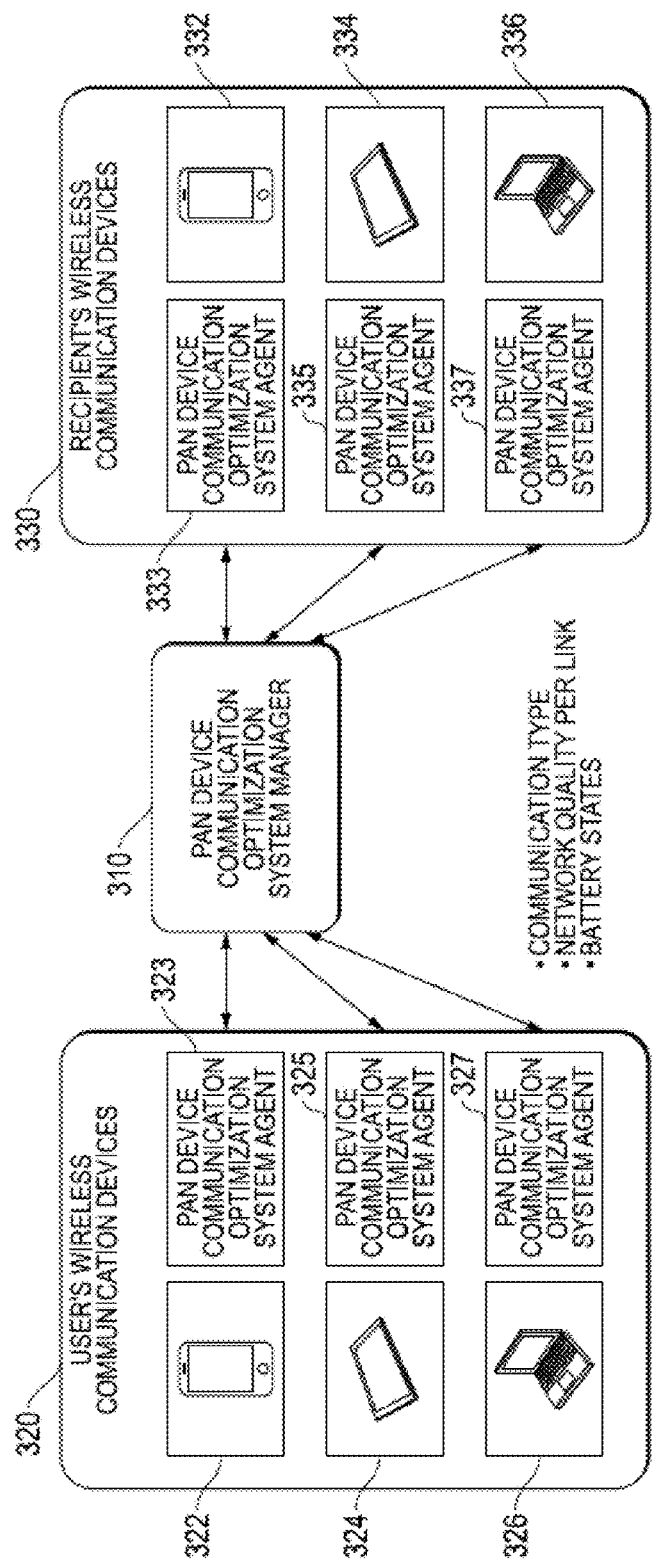
FIG. 3 is a block diagram illustrating a pan device communication optimization system for determining an optimized communication path via a wireless network between a user and a recipient using according to an embodiment of the present disclosure.

FIG. 3 illustrates a pan device communication optimization system according to an embodiment of the present disclosure. The pan device communication optimization system manager 310 may reside on a remote data center or may reside on a user information handling system. The pan device communication optimization system manager 310 coordinates data from several users of the pan device communication optimization system. In one example embodiment, the pan device communication optimization system may be present an advisory graphical user interface including end-to-end quality ratings to provide a user an informed choice of optimal wireless communication devices and an optimal wireless communication path for communication via a communication type between a user and a recipient. The graphical user interface including end-to-end quality ratings may further include capability for a user to select a choice of optimal wireless communication devices and an optimal wireless communication path to initiate communication. In another example embodiment, the pan device communication optimization system may be utilized to automatically select optimal wireless communication devices for communication via a communication type between a user and a recipient based on end-to-end quality ratings according to embodiments herein.

An example selection of user's wireless communication devices are shown at 320 in one embodiment. Wireless communication device 322 is an example embodiment of a mobile smartphone. Mobile smartphone 322 may implement a pan device communication optimization system agent 323 as application code instructions stored on computer-readable medium or otherwise embedded within smartphone 322. Wireless communication device 324 is an example embodiment of a tablet information handling system. Tablet information handling system 324 may also include pan device communication optimization system agent 325 as application code instructions stored on computer-readable medium or otherwise embedded therein. Additionally wireless communication device 326 for a user may be an example embodiment of a laptop information handling system. Laptop information handling system 326 may also include a pan device communication optimization system agent 327 as application code instructions stored on computer-readable medium or otherwise embedded therein. It is understood that any number of plurality of wireless communication devices associated with a user at 320 may be contemplated. Several of each type of wireless communication device 322, 324, 326 as well as additional types of wireless communication devices are contemplated as being available for use with the pan device communication optimization system. In some embodiments, not all wireless communication devices of a user necessarily have a pan device communication optimization system agent or participate with the pan device communication optimization system. However, availability of these unconnected devices may still be an option for wireless communication paths assessed by the pan device communication optimization system.

In an embodiment, the pan device communication optimization system may be a system deployed within an enterprise or other organization for optimization of communication paths by a user within the organization. The pan device communication optimization system may determine numerous communication paths with an intended recipient for a communication type. In an aspect of such an embodiment, the pan device communication optimization system may assist in selecting preferred wireless communication devices for a user that is determined as optimal for performance, energy, cost, or based on individual preference for a particular communication type by the user.

In another embodiment, the pan device communication optimization system may be a system deployed within an enterprise or other organization for optimization of communication paths between users and recipients within the organization. In an aspect of such an embodiment, the pan device communication optimization system may assist in selecting preferred wireless communication devices for a user or a recipient that is determined as optimal for performance, energy, cost, or based on individual preference for a particular communication type between a user and a recipient.

An example selection of recipient's wireless communication devices are shown at 330. Wireless communication device 332 is an example embodiment of a mobile smartphone. Mobile smartphone 332 may implement a pan device communication optimization system agent 333 as application code instructions stored on computer-readable medium or otherwise embedded within smartphone 332. Wireless communication device 334 is an example embodiment of a tablet information handling system. Tablet information handling system 334 may also include pan device communication optimization system agent 335 as application code instructions stored on computer-readable medium or otherwise embedded therein. Additionally wireless communication device 336 for a user may be an example embodiment of a laptop information handling system. Laptop information handling system 336 may also include a pan device communication optimization system agent 337 as application code instructions stored on computer-readable medium or otherwise embedded therein. The pan device communication optimization system may assist in selecting preferred wireless communication devices for a user or a recipient that is determined as optimal for performance, energy, cost, or based on individual preference for a particular communication type between a user and a recipient as described further herein. It is understood that fewer or additional recipient wireless communication devices may be available via the pan device communication optimization system. As can be seen from FIG. 3, the pan device communication optimization system agents 323, 325, 327, 333, 335, and 337 communicate via a network to pan device communication optimization system manager 310. In some embodiments, not all wireless communication devices of a recipient necessarily have a pan device communication optimization system agent or participate with the pan device communication optimization system. However, these devices not utilizing the pan device communication optimization system may still be an option for wireless communication paths assessed between a user wireless communication device and a recipient.

Assessment of end-to-end wireless communication paths may be made with the pan device communication optimization system. The end-to-end wireless communication paths are given QoS ratings that may be modified by weighting factors. Weighting factors may include user or recipient device preferences expressed directly or through tracked device usage trend data for various communication types. In an embodiment, the QoS ratings may be made in connection with a context aware radio resource management system measuring link quality of wireless links between a user wireless communication device 322, 324, 326 and a wireless network on one end and a recipient wireless communication device 332, 334, 336 and a wireless network on the other end. In some embodiments, the endpoint wireless link stages are the most limiting of quality of service factors such as latency, jitter, bit error rate, signal strength level and other measurements. A network based context aware radio resource management system or the pan device communication optimization system manager 310 may assess wireless links on either end of the end-to-end communication path to determine the end-to-end QoS ratings. Access to crowd sourced or previously stored QoS radio frequency traffic reports is one way links may be assessed. Additionally, contemporaneous QoS scans may be made of potential wireless links in some embodiments although the latter may take additional processing capacity and cause some delay.

Figure 4:
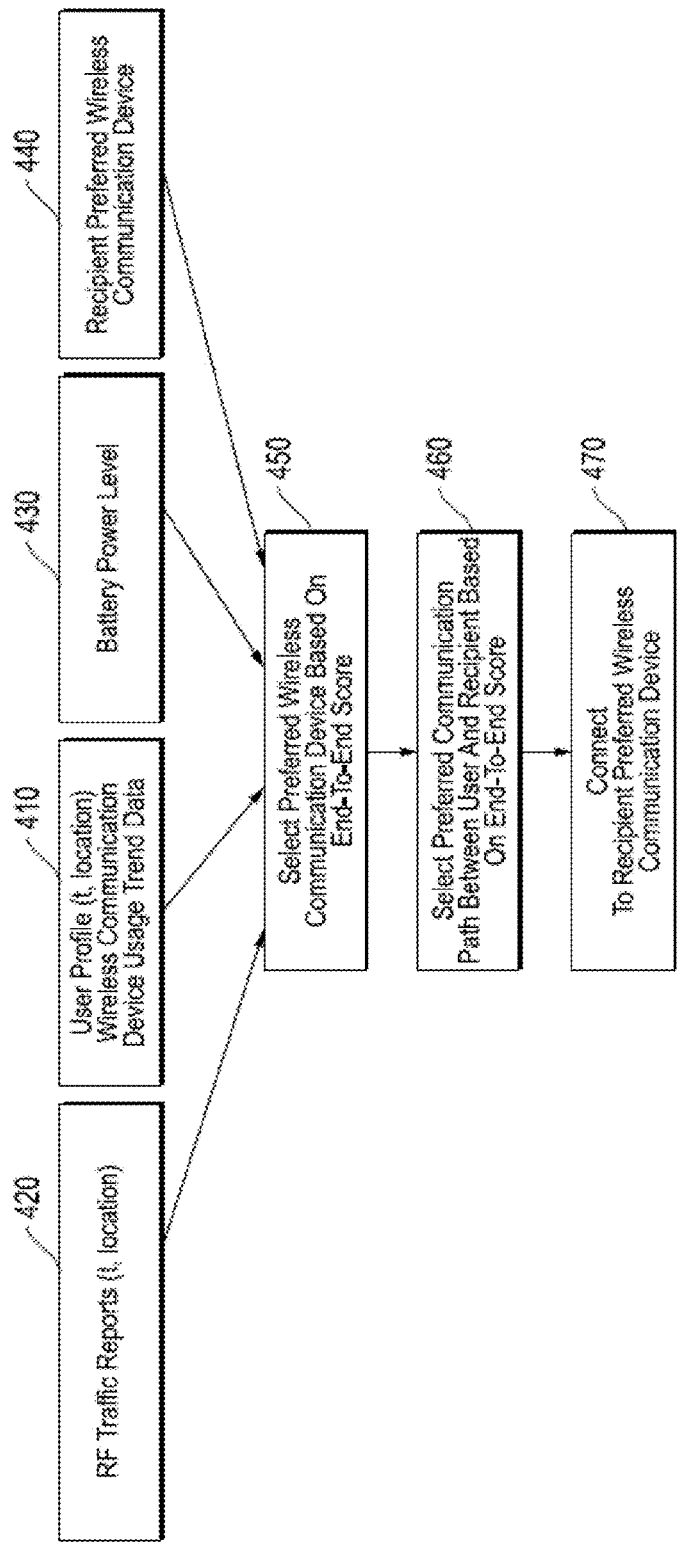
FIG. 4 is a chart illustrating a pan device communication optimization system for determining an optimized communication path via a wireless network between a user and a recipient according to an embodiment of the present disclosure.

FIG. 4 shows a pan device communication optimization system for connection between a preferred user wireless communication device and a recipient wireless communication device via a preferred wireless communication path according to an embodiment of the present disclosure. The pan device communication optimization system may be implemented in connection with a context aware radio resource management used in selecting a network and technology within a wireless network for a given location. Such a context aware radio resource management system may be used for feedback on QoS for wireless network connections or various links within the networks. An example context aware radio resource management system is disclosed in several related patent applications and issued patents of the same assignee. Additionally, factors and wireless network data relating to the context aware radio resource management system may be utilized by the pan device communication optimization system in providing end-to-end scores and selection of preferred wireless communication devices and preferred wireless communication paths between those preferred devices for a user and/or a recipient. Selection may be automatically by the pan device communication optimization system in some embodiments. In an embodiment, the selection by the pan device communication optimization system may be made with an override option available to a user. In yet another embodiment, the pan device communication optimization system may present an advisory graphical user interface including end-to-end quality ratings to provide a user an informed choice of optimal wireless communication devices and an optimal wireless communication path for communication via a communication type between a user and a recipient.

Several factors are assessed by the pan device communication optimization system and its coordination with a context aware radio resource management method in selecting a radio technology for a wireless communication path and wireless communication devices for a user and/or recipient. A software agent is deployed at a wireless communication device such as the wireless communication devices 322, 324, 326, 332, 334, and 336 or elsewhere in the network for executing the pan device communication optimization system and aspects of the context aware radio resource management system. The pan device communication optimization system software agent accesses wireless communication device usage trend data 410. The pan device communication optimization system may detect and learn patterns of usage by an individual user or recipient for particular wireless communication types. In an example embodiment, a preference score may be assigned to each as a percentage of time spent utilizing a particular wireless communication type or as a percentage of instances of using a particular wireless communication type. This data may be stored for a user or recipient in a wireless communication device usage trend database and shared across an enterprise or group via a pan device communication optimization system manager in certain aspects. In an example embodiment, wireless communication device usage trend data for a user or recipient is shown below in Table 1. The following data is merely exemplary for purposes of explanation.

TABLE 1

| Communication Type | User | Device | Preference Score |
|---|---|---|---|
| SMS Text | User A | Smart Phone | 80% |
| SMS Text | User A | Tablet | 10% |
| SMS Text | User A | Notebook | 10% |
| Video conference | User A | Smart Phone | 5% |
| Video conference | User A | Tablet | 60% |
| Video conference | User A | Notebook | 35% |
| Voice call | User A | Smart Phone | 80% |
| Voice call | User A | Tablet | 5% |
| Voice call | User A | Notebook | 15% |
| IM | User A | Smart Phone | 60% |
| IM | User A | Tablet | 10% |
| IM | User A | Notebook | 30% |

It is understood that the wireless communication device usage trend data may vary widely depending on data collection of a user's trends. The wireless communication device usage trend data may begin with certain default levels and be adjusted over time as usage data is collected for wireless communication types. It is noted that in the above example embodiment the preference scores sum to 100% for each wireless communication type. For each communication type event, the time or number of instances of voice communication type with a wireless communication device is divided into total time or number of instances of voice communication type over all available wireless devices for a user or recipient in the example embodiment. The above values are example data meant for the purposes of illustration. Additional criteria may be implemented and may alter the scoring from adding to 100% depending on the scoring system used in other embodiments as is understood by those of skill. The preference score may serve as a weighting factor for end-to-end communication path quality ratings used to determine wireless communication paths and select preferred wireless communication devices for a user, a recipient, or both. The preference score is associated with the wireless communication device and communication type. An additional factor that may be added to the preference score is cost. In an embodiment, use of technologies with extremely low cost such as Wi-Fi Direct or Bluetooth Peer-to-Peer as a communication path may have increased preference scores due to low cost. Other example alterations to preference scores are contemplated as well including preferences expressed via a user interface by a user or recipient for a particular wireless communication device or wireless communication link or path. These may shift the preference score of one or more available wireless communication devices. The shift of preference may be by any amount. In one example embodiment, the expressed preference may shift the preference score for that wireless communication device by up to 50%.

In another example embodiment, the context aware radio resource management system software agent obtains other user profile data that may also be utilized by the pan device communication optimization system that may shift preference scores for wireless communication devices. Such user profile data may be included with the wireless communication device usage trend data 410 and may be used in connection with the pan device communication optimization system for tracking user trends for wireless communication types. In an example embodiment, the user profile data from the context aware radio resource management system may establish an approximate cyclostationary usage pattern of each wireless communication device on a daily or weekly basis. The time of day, location, types of usage, and usage percentages during a sample time interval are example factors included in the user profile data. This user profile data also may include a confidence of the estimate. This may be a statistical measurement of a mean and standard deviation for a set of data. Alternatively, the confidence of estimate may involve a goodness of fit metric to an expected set of values. Alternative statistical analysis may be performed on the user profile data to provide a confidence of the estimate. These cyclostationary usage patterns may used to shift weighting the preference scores in view of anticipated usage or future availability of wireless communication devices based on time of day and location or predicted location. The shifting of preference scores may be by any amount depending on several factors. If, for example, a predicted future time or location during a communication type suggests a wireless communication device may likely be unavailable, for example a device is likely left at work or home or a user is or will be commuting or travelling, that may shift the preference score for some wireless communication devices down or other will have a preference score increase.

The pan device communication optimization system may also receive wireless link radio frequency broadband traffic reports 420 and may be in accordance with time and location data for a user or recipient and their associated wireless communication devices. In an example embodiment, the wireless link radio frequency broadband traffic reports 420 may be retrieved from the context aware radio resource management system in some embodiments. For location and time, available radio technologies and, where relevant, available service providers may be listed. The reports contain data relating to location, time and a radio frequency profile of given radio technologies for the available service providers. Certain radio technologies may not specifically be associated with a service provider such as in the case of a Wi-Fi, WiLAN or similar wireless network connection options. The radio frequency profile data may also include an associated confidence of estimate for link ratings or QoS scores. The wireless link radio frequency profile may combine recent reports, historical traffic reports, as well as data measured via an active device radio frequency scan. In an example embodiment, to minimize wireless communication device battery power consumed, radio frequency broadband traffic reports from the network may only be requested or sent when a service provider network or a wireless communication device detects a significant change in signal quality or the network broker server detects that the local crowd source information is out of date.

The wireless link radio frequency broadband traffic report for a wireless link for wireless links partially comprises a spatial-temporal radio frequency profile for the wireless links. The systems begins with a baseline mobile broadband report available from a network broker system or available from cooperative service providers if no previously measured data is available. By way of example, baseline data may be drawn from available wireless coverage maps.

Key performance indicators (KPI) comprise a spatial-temporal radio frequency profile. Data such as received signal strength (RSSI), signal-to-noise ratios (SNR), or signal to interference ratios (SIR) may be relevant channel quality indicators in a KPI matrix. Other data, may include data throughput speeds, communication latencies, jitter, and packet loss measurements. The context aware radio resource management system may actively assess the quality of wireless links being used. One or more of these performance indicators may be used to compute a link rating for a wireless link. Baseline reports rely on estimated values. For example using baseline estimated received signal strength indicators (RSSI), a link rating may be computed as follows in one embodiment:

Link Rating$(i,j)$=MAX(MIN(100%,(Estimated RSSI Signal Carrier−Minimum Signal)/Max RSSI signal−Minimum RSSI signal,0%), where $i$ is a technology index and $j$ is a service provider index.

A maximum RSSI level may be defined in a technology protocol, for example as −70 dBm. The minimum RSSI level may be defined as well, for example at −110 dBm. RSSI is not the only key performance indicator that may be used to compute link ratings. Link rating may be based on different key performance indicator values besides received signal strength. Alternatively, multiple key performance indicator values may be used in the computation of a link rating.

In other examples of a KPIs that may be used for link rating, link capacity and bit error rates (BER) may be measured. Bit error rate is the ratio of error bits to total bits sent across a wireless link. It is a metric illustrating a signal to noise ratio which can define the quality of a radio connection for a wireless link. A bit error rate may be a comparison of a sent test stream of data by a transmitter with what is received by a receiver. The bit error rate can be tested by a bit error rate tester in software which transmits a known bit pattern to or from the mobile information handling system. Pre-error correction errors are counted. A signal-to-interference ratio may also be measured. Such a measurement is based on the power levels for signal transmission (e.g., per bit) relative to interference levels in the received signal. Packet error rate, signal-to-noise measurement, or other signal quality testing is also contemplated. Data packets, such as test packets or active data, may be monitored as it is sent across wireless links to determine packet loss frequencies or resend occurrences for the packets.

A link rating matrix is established by available link protocols and may be broken down by wireless technology, service provider, or both. In an example embodiment, for a matrix of [AT&T 3G, Verizon 3G, AT&T 4G, Verizon 4G, Sprint 4G], the baseline Link Rating (j) computation may result in (70%, 80%, 95%, 90%, 30%). 100% indicates best signal link quality and 0% indicates a signal quality below a minimum acceptable level. The context aware radio resource management system may use the link rating scores to evaluate the optimal wireless service providers and available protocols for the anticipated usages for a wireless link that comprises a portion of an end-to-end wireless communication path. Thus, the link rating protocol matrix can assist in selecting wireless links and a service provider with the best scores.

The context aware radio resource management system operating on a wireless communication device may scan for wireless link mobile broadband traffic reports fitting a time and location zone for operation. Wireless link mobile broadband traffic reports may be retrieved from a central server database in the wireless networks. Alternatively they may be located elsewhere in a database such as at a network broker server system. The baseline report may be supplemented or superseded by any fresh or historical mobile traffic reports to assist in selecting a service provider and protocol. Recent or historic radio frequency profiles for time period and location zone may be used to update or supplement the wireless link mobile broadband traffic reports. More recent data may be of greater relevance however. For example, the link ratings in a radio frequency profile may utilize recently measured RSSI values instead of estimated values.

Mobile broadband traffic reports are aggregated via crowd sourcing. They may be categorized by location zone and have time and date stamps to identify freshness. Crowd sourcing of information will enhance the availability of accurate data for location zones and times of wireless communication device operation. For example, if a wireless communication device makes a request for a fresh mobile broadband traffic report, the central server database may have reports from other wireless communication devices with recent timestamps. Alternatively, the central server database may make a request for a recent mobile broadband traffic report from wireless communication devices in the same location. Whether via recent storage in the central database or via a recent request of fresh crowd sourced mobile broadband traffic reports, such a report may avoid the need for the wireless communication device to conduct a radio frequency scan itself.

Crowd sourcing mobile broadband traffic reports for locations and times provides a higher chance that a current mobile broadband traffic report for a location is available. It also increases the available data points providing greater certainty and reliability of data. Part of the benefit of crowd sourcing may also involve performing a hysteresis analysis on the data coming from multiple wireless communication devices to determine trends in wireless link selection. When a wireless link is reported having low traffic and good radio frequency conditions, traffic from systems using the context aware radio resource management system will elect that wireless link. If a large part of the crowd of wireless communication devices begin to pile onto whichever wireless link is reported to have the best available bandwidth, that link will slow down and underperform. The mobile broadband traffic reports account for this by conducting a hysteresis analysis. If a large number of users begin to select this wireless link, then the method for generating mobile broadband traffic reports accounts for this traffic and alters the recommended wireless links. For example, a second best option may be recommended as optimal for traffic and radio frequency conditions instead. Each crowd sourced mobile broadband traffic report identifies its selected link. A count of these selections can be compared to a threshold rate level of selections for a given link. If the rate of selections exceeds the threshold for a link, then the recommendation may be altered.

If there are not enough reliable historical mobile broadband traffic reports recent enough to base a wireless link assessment upon, the context aware radio resource management system may initiate a wireless communication device radio frequency scan. This scan collects data regarding possible wireless links. This radio frequency scan consumes power and processor resources so should be used sparingly, however it provides up-to-date key performance indicators (KPI) for a new radio frequency profile to be used in a mobile broadband traffic report. Based upon this new mobile broadband traffic report, the system provides a wireless link performance profile to be used by the context aware radio resource management system.

The scan or test of radio frequency links may be conducted by the context aware radio resource management system. As a first measure, received signal strength and bandwidth availability for a service provider and a protocol are determined. Then a test of radio frequency data capacity is made. This can test upload and download performance for each service provider and protocol. For example, a standard test data volume may be sent via a wireless link to a server location at the service provider. Similarly, a test data volume may be received from a server location by the wireless communication device via the wireless link. Latency of response, upload and download speed or throughput can then be measured for the service provider and protocol. The data is associated with a location zone and stamped with a time and date. The type of transmitter/receiver or wireless communication device may also be recorded. This data set provides a wireless link radio frequency profile that may become part of a mobile broadband traffic report. Upon measuring this data for a location, the report may be shared or published by the context aware radio resource management system from the mobile information handling system.

In one embodiment, the wireless link assessment may be used by the pan device communication optimization system to determine a ranked list of wireless communication paths between two points across the wireless communication network, including various steps or hops across links within the wireless communication network. Using user profile reports and radio frequency link reports, each wireless communication path may be given an overall rank. Several methods may be used to determine wireless communication path overall quality score. In one example embodiment, it may be assumed the wireless communication path is only as good as the lowest link rating score along that path. Thus, the wireless communication path rating may be determined as the same as the minimum link rating in the communication path. In another embodiment, the wireless communication path rating may take into account the diminished quality of each wireless link in the communication path that is rated at less than 100%, or a perfect rating for a link. Thus a calculation whereby the effect of each wireless link rating less than 100% determines some diminishment on the overall wireless communication path rating. In an example embodiment, the wireless communication path rating may be determined as a product of a wireless link rating of the connecting link for the user wireless communication device with the wireless link rating of the connecting link for the recipient wireless communication device as follows:

Wireless Communication Path Rating=(Link Rating for Link from Wireless Device $A$*Link Rating for Link from Wireless Device $B$), where $j$=communication path index.

For a wireless communication path=[AT&T® 3G for Device A, Verizon® 4G for Device B], an example user Wireless Communication Path Rating (j) calculation may result as follows, (90%*70%)=63%. Each wireless communication path between a user wireless communication device and a recipient can be ranked by this score. Each Link Rating used to determine the Wireless Communication Path Rating shows a quality of service score by protocol for a service provider at a location and time. For a given communication path, the Wireless Communication Path Rating may serve as an initial end-to-end quality rating upon which selection of a wireless communication path may be made by the pan device communication optimization system. The Wireless Communication Path Rating may also include additional wireless links and Link Ratings for those links along the path. Additional weighting factors may apply to the initial end-to-end quality rating to yield modified end-to-end ratings for wireless communication links for selection of wireless communication paths and user and recipient wireless communication devices. This is described further below. The above values serve only as an example for purposes of discussion.

Alternatively, energy link reports may be received as a variation of the wireless link radio frequency broadband traffic reports 420. These energy link reports contain data relating to time, location and radio frequency profile information similar to the radio frequency broadband traffic reports. In addition, measurements of energy consumed during use of a specified wireless link for a specified wireless service type is reported. The energy link data profile matrix can provide more detailed information above the mobile broadband radio frequency traffic reports. In this embodiment, the context aware radio resource management system prepares and delivers an energy link consumption report. The energy link consumption report provides data on power consumed by a wireless communication device while performing certain tasks on a wireless link at a location. Energy link consumption reports contain data indicating how many joules of energy are consumed during sending SMTP emails, sending SMS messages, conducting voice communications, video conferencing, IM, accessing internet services, streaming audio or video, or other uses of mobile information handling systems. This data amounts to another key performance indicator (KPI) in addition to capacity or link quality data for a wireless link. The context aware radio resource management system can measure and utilize some or all data such as link capacity, link quality, and energy consumption in determining preferred wireless links. Link ratings may be calculated similarly to the above description using the additional link energy consumption data. As with other input factors, a confidence of estimate associated with this data may be included. The energy link report data may combine recent energy link profiles, historical energy link reports, and measurements through wireless communication device scans during operation.

The pan device communication optimization system may access battery power level data 430 for user wireless communication devices. In an example embodiment, the pan device communication optimization system may access the battery power level data via the context aware radio resource management system which receives battery power level data from an intelligent battery management system of the wireless communication devices in the system. The battery power level input may establish thresholds for certain wireless communication protocols as being too costly in terms of power based on the remaining battery power available. Below a defined battery level threshold, the context aware radio resource management system may disable the most advanced protocols to save energy. For example, with only 10% battery power remaining, the context aware system may recommend to a user to disable high power consuming protocols such as 4G. The option may be given to the user, or automatic shut down of the radio frequency subsystem may take place. In a further example, the context aware system may recommend or shut down 3.5G at 5% remaining battery power. Any threshold levels may be set to trigger recommended shut down. In such a shut down, that wireless link rating will be at 0% or disconnected and impact the communication path overall ratings and the wireless communication device rating by the pan device communication optimization system of the present disclosure.

In another embodiment, the battery power level data may also be implemented directly by the pan device communication optimization system as another factor in consideration of end-to-end scores for wireless communication paths and for user or recipient wireless communication devices. For example, if a user wireless communication device such as a mobile smart phone is at a battery power level below a certain threshold, this may reduce the end-to-end scores for wireless communication paths involving that user wireless communication device. This is especially true for certain wireless communication types such as video conferencing or voice calls. In an example embodiment, the pan device communication optimization system may include battery power levels for available wireless communication devices associated with users or recipients as a power weight score for the wireless communication devices and associated links in the communication path. The power weight score for each wireless communication device weights the link ratings for those devices and modifies the initial end-to-end score determination for wireless communication paths involving the wireless communication devices with battery power level data available.

In some embodiments, the pan device communication optimization system agent operating on a wireless communication device associated with a user may receive recipient preferred wireless communication device data 440. The recipient preferred wireless communication device data may indicate one or more preferred wireless communication devices of a recipient for a communication type. In some embodiments, a preferred wireless communication device may transmitted to the pan device communication optimization system even if the recipient does not participate in the system. In other embodiments, such as within a group or enterprise, the pan device communication optimization system agents may operate at one or more available wireless communication devices of a recipient to determine, in parallel, preferred wireless communication devices for particular communication types according to the recipient. This data may be transmitted, via the pan device communication optimization system manager, or communicated directly to the user wireless communication device and its pan device communication optimization system agent. Such data may be used by the pan device communication optimization system agent to assist in end-to-end scoring for wireless communication paths involving the preferred recipient wireless communication devices.

The pan device communication optimization system accesses the wireless communication device usage trend data 410 and receives the wireless link radio frequency broadband traffic reports 420, battery power level data 430, and in some embodiments a selection of a preferred wireless communication device associated with a recipient 440. The pan device communication optimization system software agent determines end-to-end scores for available wireless communication paths between available user wireless communication devices and available recipient wireless communication devices are generated at 450.

The above data and inputs are assessed by the pan device communication optimization system software agent to determine the preferred wireless communication devices for a user based on comparison of the end-to-end quality scores for communication paths at 450. Additionally, preferred wireless communication devices are determined for a recipient via the end-to-end ratings assigned to wireless communication paths between the plurality of available wireless communication devices associated with a user or a recipient. In an example embodiment, this determination is based, at least in part, on some subset of data in the above reports. For example, one wireless communication device for a user or a recipient is, on average, connected to communication paths with higher ratings. In other embodiments, the preferred wireless communication device ratings by the pan device communication optimization system may be determined based on the highest communication path rating or highest rated link among the wireless communication devices.

These wireless communication device ratings may be weighted significantly by preference scores as described further herein relating to device usage trend data and express preferences.

In an example embodiment, the end-to-end rating for wireless communication paths begins by selection of a user wireless communication device (Device A) and a recipient wireless communication device (Device B). Scanning assessment is made of available wireless communication options for communication between Device A and Device B. If a low cost connection such as Bluetooth Peer to Peer or Wi-Fi Direct options are available and have sufficient capacity and signal quality, such a selection may be made. However, such wireless connections may also be included in the pan device communication optimization system assessment of all end-to-end communication paths with multiple wireless path links. Assessment of communication paths between user wireless communication device (Device A) and a recipient wireless communication device (Device B) will include additional available network path options on various communication technologies (2G, 3G, 3.5G, 4G, etc.) and from various service providers. The pan device communication optimization system estimates an end-to-end link quality score for each wireless connection path between Device A and Device B as described above. In an example embodiment, the pan device communication optimization system may access the context aware radio resource management system to determine the wireless Link Ratings from Device A to an available network and Link Ratings from a back-end wireless network to Device B. Link Ratings may also be determined for any number of intermediate hops or links along the wireless communication path being assessed. The Link Ratings may be determined from wireless link radio frequency broadband traffic reports 420 as discussed above. An end-to-end quality score is estimated from the above Link Ratings for one or more alternative service providers and technologies for wireless communication paths between Device A and Device B. Additionally, the end-to-end quality scores for wireless communication paths are similarly estimated between one or more user wireless communication devices and one or more recipient wireless communication devices. An aggregation of end-to-end quality scores involving a user wireless communication device may indicate an initial assessment of a preferred user wireless communication device before usage trends for communication types are assessed. For example, the Link Rating for wireless link connection between Device A and a wireless network technology may be combined with the Link Rating for the connection between Device B and the same or different wireless technology that form the end-to-end wireless communication path between Device A and Device B. For wireless communication paths with multiple wireless hops or links, the product of the plurality of the Link Ratings may be used to arrive at an initial end-to-end quality score for the end-to-end wireless communication path. In another embodiment, the lowest Link Rating of among the wireless links in the end-to-end wireless communication path may be adopted as the end-to-end quality score. It is understood that the wireless communication path may span across multiple service providers or wireless technologies.

Similarly, preferred recipient wireless communication devices may be initially assessed as preferred based on estimated end-to-end quality scores associated with that wireless communication device. As is discussed further, the initial end-to-end estimated quality scores are modified by battery power data and by user preference data to yield final end-to-end ratings. Other modifications to end-to-end ratings may also be implemented. The pan device communication optimization system may present an advisory graphical user interface including final end-to-end quality ratings to provide a user an informed choice of optimal wireless communication devices and an optimal wireless communication path for communication via a communication type between a user and a recipient as explained. The end-to-end quality ratings may include the final end-to-end scores or scores for individual wireless devices and may appear similar to that shown in Table 2. In other embodiments, the advisory graphical user interface including end-to-end quality ratings may include a more qualitative rating for wireless devices, providers, or technologies for wireless communication paths between a user and a recipient. In an example embodiment, a end-to-end quality rating such as "good," "better," or "best" may be used. Each qualitative end-to-end rating may be assigned a end-to-end quality score range in an example implementation. It is understood that other qualitative indicators are also contemplated for use with the an advisory graphical user interface including final end-to-end quality ratings.

Example end-to-end quality scores for Device A and Device B may be seen below in Table 2. In this example, only one technology type, such as 2.5G, 3G, 4G, etc., is shown as assessed for purposes of illustration.

TABLE 2

| Device A | Device B | End-to-End Quality Score Est. |
| --- | --- | --- |
| Provider A/ Technology A | Provider A/ Technology A | 78 |
| Provider A/ Technology A | Provider B/ Technology A | 65 |
| Provider B/ Technology A | Provider A/ Technology A | 77 |
| Provider B/ Technology A | Provider B/ Technology A | 56 |

In an example embodiment, battery power levels 430 for wireless communication devices may be applied to initial end-to-end quality estimations to yield updated end-to-end quality rating for wireless communication paths. Such a battery power level may be applied as a multiplier weighting factor to the initial end-to-end quality estimations. In an embodiment, the new adjusted end-to-end score=Initial end-to-end quality estimation*Power weight score (Device A)*Power weight score (Device B). The power weighting score is assigned as a percentage. For example, above a threshold battery power level for a device (e.g., 40%), the power weight score may be set at 100%. Below the threshold battery power level, the power weight score decreases to 0% for a device power level at a second lower threshold power level (e.g., 5%). It is understood that any threshold levels may be used in establishing the power weighting score index with reported battery power levels for the wireless communication device. In a further example, the power weight score of 100% may be assigned for device power levels above 50% battery capacity remaining The power weight score index line may linearly drop 100% to zero for device power levels between 50% and 10%. It is understood that any power weight score index curve relating to the device power level may be applied. Further, for a wireless communication path involving multiple hops and devices, a power weight score may be applied for each device along the wireless communication path if applicable.

In another example embodiment, user or recipient preference data from wireless communication device usage trend data 410 may be applied to initial end-to-end quality estimations to yield preference levels for wireless communication devices. A device preference multiplier associated with a user or recipient and involving the communication type and cost of wireless technology access factors may be applied as a multiplier to the initial end-to-end quality estimations. In an example embodiment, the new adjusted end-to-end score=Initial end-to-end quality estimation*Preference score (Device A, Communication type, Cost)*Preference score (Device A, Communication type, Cost). The preference score is assigned as a percentage. In an example embodiment, the preference score percentage may reflect usage percentage of a wireless communication device for a particular communication type. This usage percentage may be modified by a user or recipient in an expressed preference for one or more available wireless communication devices for a communication type via a user interface. In other embodiments, the usage percentage and, thus a determined preference, is a learned value based on measured observation of usage trends for communication types across available wireless communication devices. As described above, the preference score may also be shifted by the pan device communication optimization system in some embodiments based on expressed user or recipient preferences. Additionally, the preference score may be shifted based on user profile information for expected time and locations for predicted cyclostationary behavior of a user or recipient.

In yet another embodiment, the battery power levels and user preference scores may be applied to alter the initial end-to-end quality estimation scores. In an example embodiment, the new adjusted end-to-end score=Initial end-to-end quality estimation*Preference score (Device A, Communication type, Cost)*Power weight score (Device A)*Preference score (Device A, Communication type, Cost)*Power weight score (Device B).

At 460, the pan device communication optimization system software agent selects preferred wireless communication paths between the user and the recipient wireless communication devices by comparison of the end-to-end scores determined for those devices. The pan device communication optimization system software agent assesses user or recipient usage trends or preferences for devices, RF traffic reports, battery power levels, energy link reports, and additional factors, such as subscriber cost of wireless link usage, to establish end-to-end ratings for wireless communication paths. As with other factors, subscriber cost or settings may influence the determination by weighting protocol options and influence the scoring described above. In an example embodiment, it may be used as a multiplier or other weighting factor in determining end-to-end ratings or scores for wireless communication paths. Alternatively, settings or subscriber cost may be used to mask out protocol options altogether. For example, cost or battery energy power levels may mask out protocol options or wireless communication devices in some embodiments.

At 470, the pan device communication optimization system software agent may initiate communication of the selected communication type along a preferred wireless communication path between a user wireless communication device and a recipient wireless communication device in an embodiment of the present disclosure. In doing so, preferences of wireless communication device based on usage trends for a wireless communication type are taken into account in selecting either the user wireless communication device to conduct the communication, or the recipient wireless communication device selected for connection, or both. This is done in accordance with determining the preferred wireless communication path between the user wireless communication device and the recipient wireless communication device.

The request is made for access to the selected network to establish the wireless communication path between the user and the recipient devices. The pan device communication optimization system software agent transmits a command to the preferred user wireless communication device, which may be the local device operating the software agent, to initiate communication via the wireless communication network to the recipient wireless communication device of the preferred communication path. In an embodiment, the radio frequency subsystems of a wireless adapter may contain individual subscriber identity module (SIM) profiles for each technology service provider and their available protocols as well as a wireless access system for WLAN and similar wireless connections. The radio frequency subsystems may have an application processor or controller for the wireless adapter capable of switching between SIM profiles or WLAN or similar wireless network connections at the wireless communication device. Thus, a wireless link recommendation from a pan device communication optimization system and a context aware radio resource management system would not need to be transmitted to network broker server system, but may be selected with a SIM profile for a recommended service provider and protocol and seek direct access. Alternatively it could be submitted to a network broker server systems such as an MVNO. Nonetheless, billing and other coordination of SIM profile options may be managed by a broker such as an MVNO. The pan device communication optimization system and context aware radio resource management system is described further below.

Figure 5:
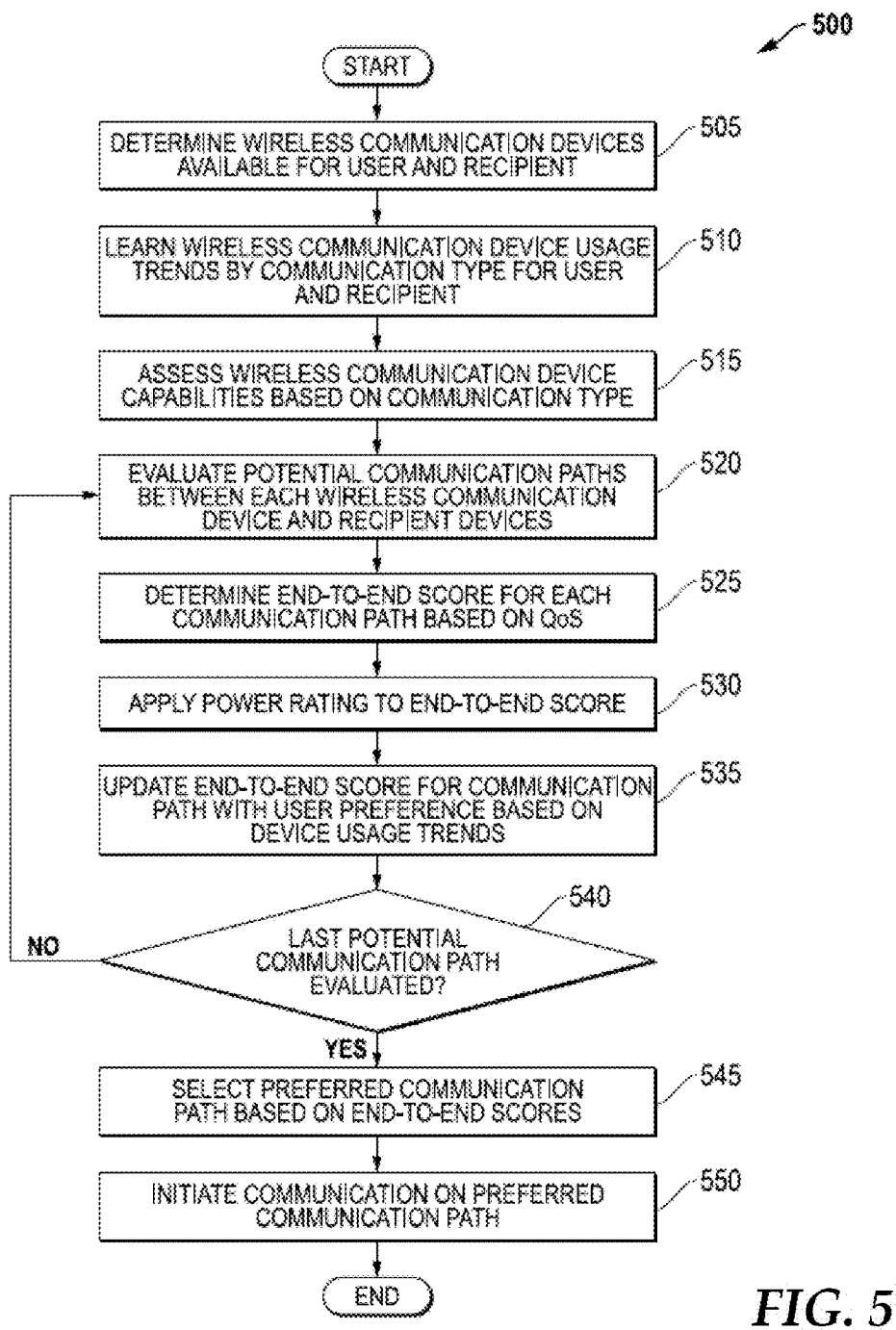
FIG. 5 is a flow diagram illustrating a method of determining an optimized communication path via a wireless network using a pan device communication optimization system according to an embodiment of the present disclosure.

FIG. 5 illustrates a method 500 for determining a preferred wireless communication path between a user wireless communication device and a recipient wireless communication device using the pan device communication optimization system according to one embodiment. In this example embodiment, one or more wireless communication devices may be associated with a user. Additionally, one or more wireless communication devices may be associated with a recipient. It is understood that each of the following steps may be performed by the pan device communication optimization system software at a pan device communication optimization system manager remotely located from the wireless communication devices, or one or more pan device communication optimization system software agents located on one or more wireless communication devices, or some combination of the same. For purposes of the presently described embodiment, examples of the elements of the pan device communication optimization system software, manager elements and agent elements, may be described for explanation purposes.

At 505, the pan device communication optimization system software agent may scan for wireless communication devices that are active and available to a user. As an initial matter, the pan device communication optimization system software agent detects selection by a user of a wireless communication type and selection of a recipient user. This may be done via a typical communication application such as a phone application, text application or the like. The pan device communication optimization system may operate in the background of an information handling system to detect these selections by a user from typical communication applications available to a user. Then the pan device communication optimization system may provide options to a user of a preferred wireless communication device or communication path to assist in providing an optimized communication experience. In other embodiments, a pan device communication optimization system user interface may be used to select communication method and a desired recipient.

The pan device communication optimization system software receives a selection of a communication type and a wireless communication recipient to begin evaluation of options for the wireless communication paths. Upon doing so, wireless communication devices associated with the user are determined from database information relating to communication contacts or from access to pan device communication optimization system software agents located on the user wireless communication devices which may identify associated wireless communication devices. In some embodiments, if a recipient is a participant in the pan device communication optimization system, a similar set of wireless communication devices associated with the recipient are determined. Association with a user or recipient within the pan device communication optimization system may include a database of wireless communication devices associated with each user or recipient. This data may be derived from a database similar to a contacts database. In an embodiment, the wireless communication devices may be identified by type and have contact information including telephone numbers, IP addresses, email contact information, and similar contact data to enable various communication types with each potential wireless communication device. Additionally, information about wireless communication device types is also relevant to a contacts database that may be established to identify potential wireless communication device types associated with a user or recipient.

In one embodiment, the pan device communication optimization system software agent may access a database to determine wireless communication devices associated with a user and determine, via similar pan device communication optimization system software agents on those systems, whether the wireless communication devices are active. The pan device communication optimization system software agents on the user wireless communication devices may also determine via GPS or other location data whether each of the plurality of potential wireless communication devices associated with a user are collocated and active near a user. Similarly, pan device communication optimization system software agents on wireless communication devices associated with a recipient end user may similarly report data for available and active wireless communication devices.

In another embodiment, the pan device communication optimization system software may ping pan device communication optimization system software agents on potential user or recipient associated wireless communication devices to determine available devices. In yet other embodiments, a database containing options for communicating between a user and a recipient such as a contacts database may be accessed and include the plurality of available wireless communication devices regardless of whether those devices are part of the pan device communication optimization system.

Proceeding to block 510, the pan device communication optimization system software will determine wireless communication device usage trends based on recorded data for usage of wireless communication devices for types of wireless communication recorded as preference score data. Similarly, additional factors including those described above for preference scores for wireless communication devices including expressed preferences and cyclostationary data relating to device use may be accounted for in the wireless device usage trend data and preference scores.

At block 515, the pan device communication optimization system software determines wireless communication device capabilities based on communication type. Several wireless communication device capabilities are determined. In example embodiments, the wireless communication device capabilities may include communication types available with a device, security access available to wireless systems, technology capabilities of transmitter systems, and service provider subscriptions associated with each wireless communication device. In some embodiments, smart battery management systems report battery power levels available for each of the wireless communication devices as part of the wireless communication device capabilities. Further device capabilities may also be assessed including current functions operating on the wireless communication devices that may impede or limit capabilities to operate within a communication type due to occupied RF capacity, limited processor capacity, or the like.

Proceeding to block 520, the pan device communication optimization system software determines potential wireless communication paths between each available wireless communication device associated with the user and each available wireless communication device associated with the recipient of a wireless communication type. At block 525, the pan device communication optimization system software will assess wireless link ratings reflecting QoS/capacity scores for links in a wireless communication path as received from a context aware radio resource management system and in accordance with the disclosure herein. The pan device communication optimization system software will generate an initial end-to-end quality rating for the wireless communication path between each pair of wireless communication devices associated with the user and recipient respectively.

Proceeding to block 530, power weighting scores reflecting battery power capacity for the wireless communication devices associated with a user and recipient in a wireless communication path are applied in one embodiment. The power weighting scores may modify the initial end-to-end quality ratings to yield an updated end-to-end rating score for each communication path to account for wireless communication device available power levels. It is understood, the power weighting scores are but one example of weighting factors that may be applied to the initial end-to-end quality rating to assist in determining optimal wireless communication paths and optimal wireless communication devices from among the plurality of available devices. Application of power weighting scores may be made in accordance with disclosures herein.

Proceeding to block 535, another weighting score may be applied in another embodiment. The pan device communication optimization system software may apply a preference score as a weighting factor to the initial end-to-end quality ratings. The preference scores are applied to the initial end-to-end quality ratings to yield an updated end-to-end rating score for each communication path. Application of the preference score may also be made in accordance with the embodiments disclosed herein. The preference score will reflect usage trends recorded from a user or recipient or expressed directly by a user or recipient with respect to wireless communication devices to use for particular wireless communication types. It is understood that multiple weighting factors such as the preference score and the power weighting score above in block 530 may be applied to initial end-to-end quality ratings for communication paths in any order or in any combination. It is also understood that in some embodiments, weighting factors may not be applied. Other example weighting factors may include wireless link access cost for example.

At decision block 540, the pan device communication optimization system software determines if each available wireless communication path between the wireless communication devices associated with the user and recipient respectively has been evaluated with an end-to-end quality rating score. If not, the flow returns to block 520 to evaluate the next wireless communication path between the user and recipient.

If the last wireless communication path between user and recipient wireless communication devices has been evaluated to yield weighted end-to-end quality ratings, then flow proceeds to block 545. At block 545, the pan device communication optimization system software compares the weighted end-to-end quality rating scores for the plurality of wireless communication paths evaluated and selects one or more preferred wireless communication paths for a communication type between a user and recipient. These preferred wireless communication paths may be presented as a set of options via displayed via user interface to a user. In another embodiment, a top preferred wireless communication path based on the weighted end-to-end quality rating scores may be selected automatically by the pan device communication optimization system software.

Flow then proceeds to block 550 where the pan device communication optimization system software may initiate a wireless communication of the type selected by a user wireless communication device. Access is established via the selected wireless links to establish the preferred wireless communication path with a recipient wireless communication device. At this point the process ends.

Figure 6:
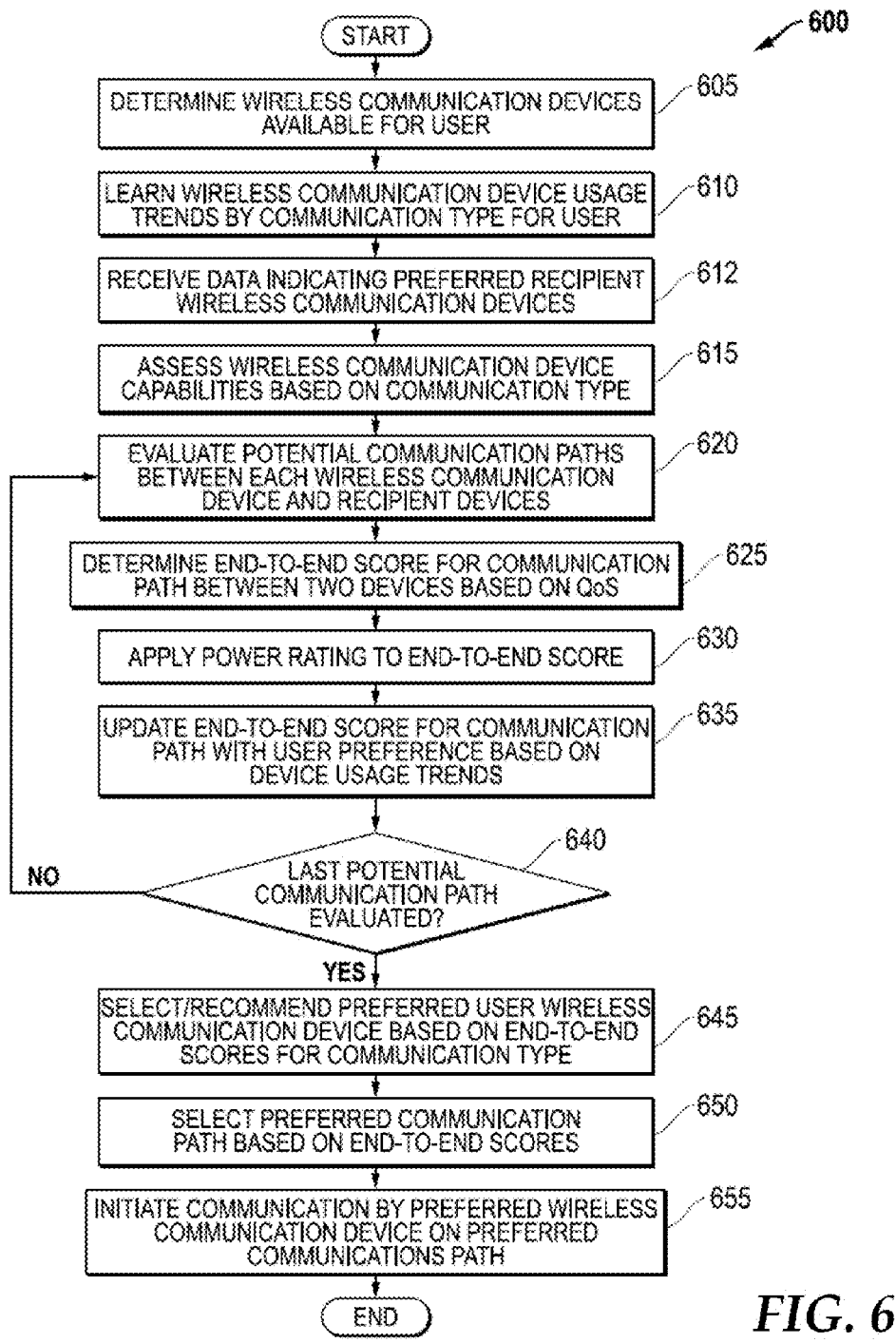
FIG. 6 is a flow diagram illustrating a method of determining an optimized communication path via a wireless network using a pan device communication optimization system according to another embodiment of the present disclosure.

FIG. 6 illustrates a method 600 for determining a preferred wireless communication path between a user wireless communication device and a recipient wireless communication device using the pan device communication optimization system according to another embodiment of the present disclosure. In this example embodiment, a one or more wireless communication devices may be associated with a user. These user wireless communication devices may operate the pan device communication optimization system software agents to assist in determining optimal wireless communication paths with a recipient. It is understood that each of the following steps may be performed by the pan device communication optimization system software at a pan device communication optimization system manager remotely located from the wireless communication devices, or on one or more pan device communication optimization system software agents, or any combination of the same. For purposes of the presently described embodiment, the examples are described as function on a pan device communication optimization system software agent, but could occur on any of the elements of the pan device communication optimization system software.

At 605, the pan device communication optimization system software agent may scan for wireless communication devices that are active and available to a user. Upon the pan device communication optimization system software agent receiving a selection of a communication type and a wireless communication recipient from the user, the determination of available wireless communication devices associated with a user occurs. Wireless communication devices associated with a user may be listed in a database such as a contacts file.

In other aspects, pinging or otherwise verifying that wireless communication devices are associated with a user may be conducted. Similarly, pinging wireless communication device may determine those that are active and, therefore, available. In another embodiment, a GPS or other location index is used to determine which wireless communication devices are collocated near a user and thus physically available for the communication type.

Proceeding to block 610, the pan device communication optimization system software will determine wireless communication device usage trends. One aspect of the wireless communication device usage trends includes recorded data relating to usage of wireless communication devices for types of wireless communication. Given a finite number of wireless communication devices associated with a user, the recorded activity may be used as preference score. In an embodiment, the preference score is a percentage of time or instances of a communication type that occurs on a wireless communication device associated with the user. Similarly, additional factors may directly impact the preference score. For example, preference scores for wireless communication devices may be influenced by expressed preferences received from a user via a user interface. In another example, cyclostationary data relating to anticipated wireless communication devices to be used or a location of a user relative to those wireless communication devices may be accounted for in preference scores. For example, a user that is commuting or otherwise travelling may have a limited set of preferred, or available, wireless communication devices.

Proceeding to block 612, the pan device communication optimization system software agent may receive data indicating a recipient wireless communication device for communication via the communication type. In an embodiment, the received recipient wireless communication device associated with a recipient may be the only contact information or device known to the pan device communication optimization system or permitted for communication based on a recipient's wishes as known to a user. In this example embodiment, a user may establish in the pan device communication optimization system software agent that contacting a recipient on a personal device may be inappropriate for in a work environment or vice-versa. Thus, selection of the available recipient wireless communication device may be limited. In another example embodiment, the recipient wireless communication devices may not participate in the pan device communication optimization system and only one wireless communication device contact information may be known to the user.

In other embodiments, the pan device communication optimization system software may operate in parallel at a recipient device or a pan device communication optimization system software manager may select a preferred wireless communication device associated with the recipient and transmit that selection to a user wireless communication device. The selection of the preferred wireless communication device associated with the recipient may be transmitted to the pan device communication optimization system software agent for evaluation of potential wireless communication paths with that recipient device. In the embodiments, it is understood that a plurality of available wireless communication devices associated with a recipient may be identified in the received data.

At block 615, the pan device communication optimization system software determines wireless communication device capabilities. The capabilities of the wireless communication device associated with the user and the recipient may involve the selected communication type. In an example embodiment, wireless communication device capabilities may include determining various wireless access options, technologies, and service providers available to each wireless communication device. Additionally, smart battery management systems report battery power levels available for each of the wireless communication devices as part of the assessment of the wireless communication device capabilities in an embodiment. Capabilities may also be assessed for both the user device and the recipient device in some embodiments. Other wireless communication device capabilities may be assessed in accordance with embodiments herein. For example, assessment of current operations on the wireless communication devices may also be determined to assess capabilities of RF capacity, processor capacity, or the like. For example, an ongoing video download or video streaming may limit wireless communication device capability for some wireless communication types.

Proceeding to block 620, the pan device communication optimization system software determines potential wireless communication paths between each available wireless communication device associated with the user and the wireless communication device associated with the recipient. Evaluation of the wireless communication paths is made in view of the selected wireless communication type. At block 625, the pan device communication optimization system software will assess wireless link ratings reflecting QoS/capacity scores for links in the wireless communication path as received from a context aware radio resource management system and in accordance with the disclosure herein. The wireless communication path will be limited at least by the lowest rated link and may be limited to a degree by all links in the path. The pan device communication optimization system software will generate an initial end-to-end quality rating for the wireless communication path between each wireless communication devices associated with the user and the recipient wireless communication device.

Proceeding to block 630, power weighting scores reflecting battery power capacity for the wireless communication devices associated with a user is applied to the initial end-to-end quality ratings to modify the end-to-end rating score. In some embodiments, the battery power capacity of the recipient wireless communication device is also applied as a power weighting score. In other example embodiments, more than one recipient wireless communication device is identified as available in received data and power levels of those recipient devices may be relevant. It is understood, the power weighting scores are but one example of weighting factors that may be applied to the initial end-to-end quality rating to assist in determining optimal wireless communication paths and optimal wireless communication devices from among the plurality of available devices.

Proceeding to block 635, the pan device communication optimization system software may apply the preference score as a weighting factor to the initial end-to-end quality ratings. In an embodiment, application of the preference score as a weighting factor may be applied to end-to-end quality ratings in addition to application of other weighting factors such as the power weighting score above in block 630. The preference scores for the user or recipient wireless communication devices are to implement observed wireless device usage trends and expressed preferences by a user or recipient for conducting communication wirelessly from among available wireless communication device options. Accounting for the user or recipient preferences for wireless communication device type is useful in enhancing the user experience while providing assistance in selection of highest quality wireless communication path from among the options available. The predictive capabilities of the context aware radio resource management system in determining future locations during communication and future availability of wireless communication devices may also influence preference scores in accordance with embodiments above by shifting preference scores. For example, during a commute time, laptop or tablet computing systems may be unavailable and yield lower preference scores. In another example, a location prediction may indicate preference changes such as an office location may shift preferences for a laptop where a home location may shift preferences to a different wireless communication device. Additionally, preference score may be impacted by selection of cost effective communication paths. For example, a macro-cellular connection may vary in cost depending on subscriber plans applied to wireless communication devices and may yield a preference score shifts accordingly.

At decision block 640, the pan device communication optimization system software determines if each available wireless communication path between the available wireless communication devices associated with the user and recipient device has been evaluated with an end-to-end quality rating score. If not, the flow returns to block 620 to evaluate the next wireless communication path between the user and recipient.

If the last wireless communication path between user and recipient wireless communication devices has been evaluated at decision block 640, flow proceeds to block 645. At block 645, the pan device communication optimization system software compares the weighted end-to-end quality rating scores for the plurality of wireless communication paths evaluated. The pan device communication optimization system software agent may recommend a user wireless communication device for the communication type. For example, if the wireless communication device operating the pan device communication optimization system software agent is not the optimal wireless communication device, the pan device communication optimization system software agent may recommend another wireless communication device associated with the user for communication.

Proceeding to block 650, the pan device communication optimization system software agent also selects one or more preferred wireless communication paths for a communication type between a user and recipient. These preferred wireless communication paths may be presented as a set of options via displayed user interface. A user of the pan device communication optimization system may select from among the preferred wireless communication paths for the communication type. In another embodiment, a top preferred wireless communication path based on the weighted end-to-end quality rating scores is selected automatically by the pan device communication optimization system software. Flow then proceeds to block 655 where the pan device communication optimization system software agent may initialize the wireless communication at a preferred user wireless communication device and on a preferred wireless communication path. This functionality may occur between available wireless communication devices associated with a user. A command to use a wireless communication device may be transmitted via the pan device communication optimization system software to the desired wireless communication device associated with the user. Connection is also made via the selected wireless links to create the preferred wireless communication path with the recipient. At this point the process ends.

Figure 7:
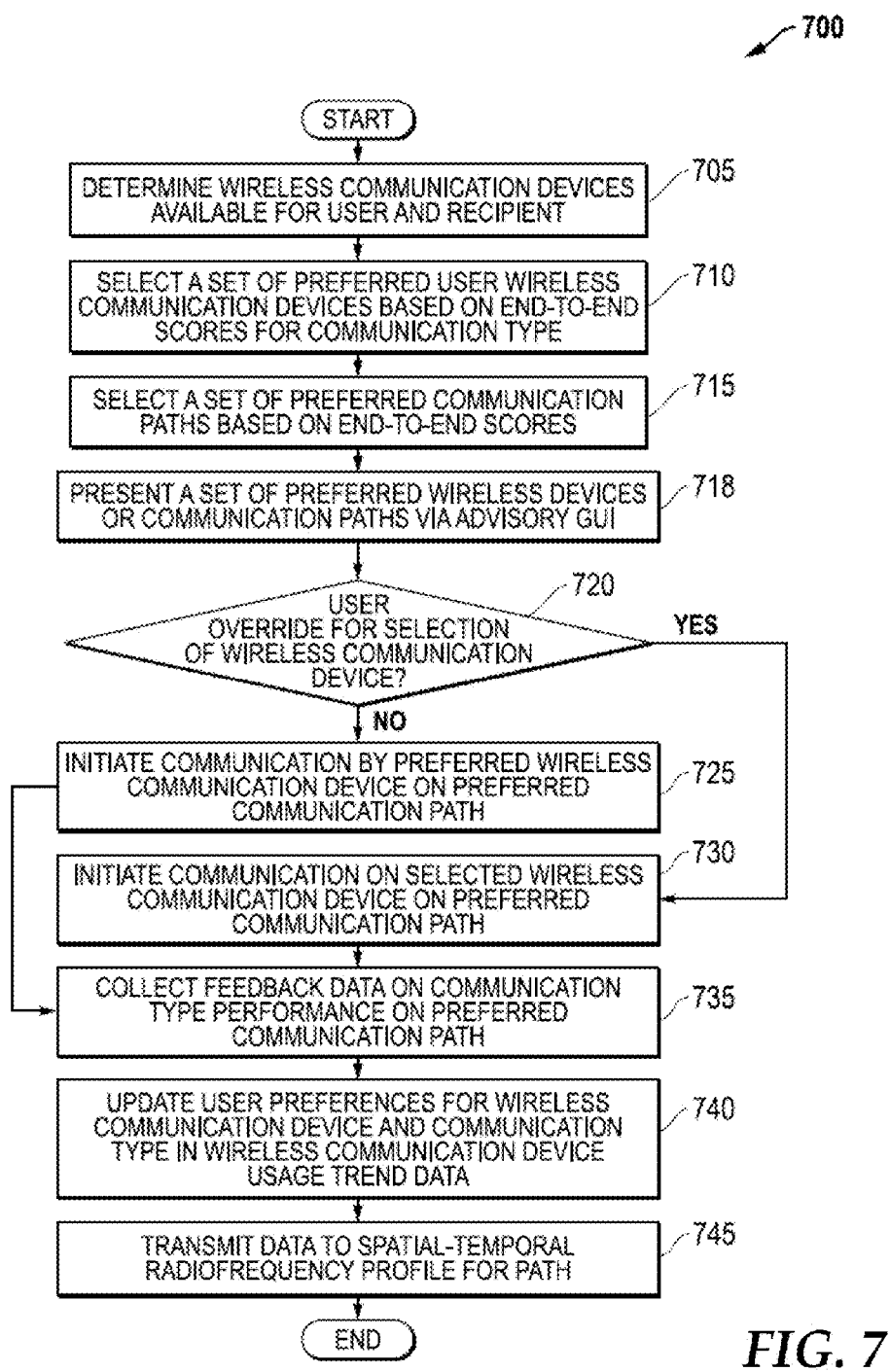
FIG. 7 is a flow diagram illustrating a method of determining an optimized communication path via a wireless network using a pan device communication optimization system according to yet another embodiment of the present disclosure.

FIG. 7 illustrates a method 700 for determining a preferred wireless communication path between a user wireless communication device and a recipient wireless communication device using the pan device communication optimization system according to yet another embodiment. In this example embodiment, a one or more wireless communication devices may be associated with a user. Additionally, one or more wireless communication devices may be associated with a recipient. It is understood that each of the following steps may be performed by the pan device communication optimization system software at a pan device communication optimization system manager remotely located from the wireless communication devices, or one or more pan device communication optimization system software agents located on one or more wireless communication devices, or some combination of the same. For purposes of the presently described embodiment, examples of the elements of the pan device communication optimization system software, manager elements and agent elements, may be described specifically for explanation purposes or may be simply referred to as the pan device communication optimization system.

At 705, the pan device communication optimization system software receives a selection of a communication type and a wireless communication recipient. In response, the pan device communication optimization system determines wireless communication devices associated with a user and those associated with the recipient. The pan device communication optimization system may scan for wireless communication devices that are active and available to a user. For example, the pan device communication optimization system may determine via GPS or other location data whether the plurality of available wireless communication devices associated with a user or recipient are collocated and active near the user or recipient. Similarly, pan device communication optimization system software agents on wireless communication devices associated with a user or recipient may report data on availability, location, power state, or the like.

The pan device communication optimization system then begins evaluation of options for the wireless communication paths between one or more user wireless communication devices and one or more recipient wireless communication devices at block 710. Based on availability, wireless communication device, capabilities to communicate via the communication type, or based on battery power levels, the pan device communication optimization system may select available user wireless communication devices. Proceeding to block 715, communication paths between user wireless communication devices and recipient wireless communication devices are evaluated for end-to-end quality ratings relating to latency, jitter, packet loss levels, and signal strength among other QoS metrics for wireless link ratings for one or more wireless links in each communication path as described above. This initial end-to-end quality rating is modified by various multipliers including a preference score multiplier to express a user's or recipient's trends in device usage or expressed desire to use particular wireless communication devices. Cost of wireless link access is also a factor in preference score adjustments. Other multipliers may include a power weight score based on battery power levels for available wireless communication devices as explained above. Between the assessments of block 710 and 715, an end-to-end quality rating of various communication paths between user and recipient wireless communication devices may be derived and compared. One or more preferred wireless communication paths may be selected as a result of this comparison among a set of preferred user communication devices, a set of preferred wireless communication paths, or a set of preferred recipient wireless communication devices. In an embodiment, the system may also determine a preferred user communication device, a preferred recipient communication device, or a preferred wireless communication path having a highest rating based on end-to-end quality rating as modified based on above embodiments.

Proceeding to block 718, the pan device communication optimization system may present an advisory graphical user interface to a user showing a set of preferred user communication devices, a set of preferred recipient communication devices, or a set of preferred wireless communication paths. In one embodiment, the advisory graphical user interface may present the set of preferred user communication devices, the set of preferred recipient communication devices, or the set of preferred wireless communication paths including end-to-end quality ratings. The end-to-end quality ratings presented may include the determined end-to-end quality scores determined by the pan device communication optimization system or may include other indicators showing the level of end-to-end rating. For example, a ranked list may be presented or a different rating system such as a tiered ranking classification such as "good," "better," and "best" may be utilized in the advisory graphic user interface. In an embodiment, the advisory graphical user interface including end-to-end quality ratings may also indicate the highest rated from among the preferred user communication devices, the preferred recipient communication devices, or preferred wireless communication paths based on end-to-end quality rating as modified based on above embodiments. In another embodiment, the advisory graphical user interface including end-to-end quality ratings may provide for a user to select a user wireless communication device, a recipient wireless communication device or a wireless communication path as an override to the pan device communication optimization system selection of a highest rated wireless device(s) or path. The override options may be selected from the set of preferred user communication devices, the set of preferred recipient communication devices, or the set of preferred wireless communication paths including end-to-end rating scores or other indicators presented in the advisory graphical user interface. In another aspect, the override options may also be selected from wireless devices or paths not included in the set of preferred wireless devices or paths.

Flow proceeds to decision block 720 where the pan device communication optimization system detects whether an override for the selection of a wireless communication device or a wireless communication path is indicated by a user. The selection of a preferred communication path may be made by the pan device communication optimization system as the highest-rated rated wireless device(s) or path. In one aspect, the override selection may be achieved via selection of a wireless device or path for communication via the advisory graphical user interface including end-to-end quality ratings. In another aspect, this may be achieved by prompting a user for confirmation of a selection of a preferred communication path. In an example embodiment, the pan device communication optimization system agent may provide a user via the advisory graphical user interface with a ranked order of preferred wireless communication paths and wireless communication devices for a communication type with a recipient. For example, a user may elect to use the device in-hand instead of another device recommended by the pan device communication optimization system agent. An override option may be presented in that case for example. In another aspect, a user may initiate communication on any wireless communication device, including the one in-hand, via the pan device communication optimization system whether selected as part of a preferred wireless communication path or not.

If an override selection is not received at decision block 720, then flow proceeds to block 725. The pan device communication optimization system initiates the communication type by the preferred wireless communication device on the preferred wireless communication path as determined by the pan device communication optimization system comparison of end-to-end quality ratings.

If an override selection is received at decision block 720, then flow proceeds to block 730. The pan device communication optimization system initiates the communication type by the override selection of wireless communication device. In an embodiment, the initiation of communication type occurs on a preferred wireless communication path for the override-selected wireless communication device as determined by the pan device communication optimization system.

Proceeding to block 735, the pan device communication optimization system software will conduct data collection for the wireless communication device usage trends based on recording usage of the selected or preferred wireless communication devices and wireless communication path as initiated above. This collected data will be added to wireless device usage trend data to further reflect preferences of a user or recipient. In an embodiment at block 740, the wireless communication device usage trend data for the communication type is updated in a wireless communication device usage trend database for the user, the recipient, or both.

Flow then proceeds to block 745. In an embodiment, the context aware radio resource management system also will monitor the communication across the preferred communication path for the QoS and capacity metrics as described above. These QoS/capacity metrics are recorded to update link ratings any portion of the wireless communication path. The metrics are transmitted to a spatial-temporal radiofrequency profile relevant to the wireless links such as those linking the user or recipient wireless communication devices to the wireless access network. In some embodiments, the QoS/capacity metrics may also be recorded for the wireless communication path as a whole. At this point the process ends.

It is understood that the methods and concepts described in the figures above, including in FIGS. 4, 5, 6, and 7, may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a wireless adapter to communicate with a wireless link;
   a storage device to store wireless communication device usage trend data for a plurality of available wireless communication devices associated with a user;
   an application processor executing instructions for a pan device communication optimization agent to determine an end-to-end quality score for one or more available wireless communication devices associated with the user, wherein the end-to-end quality score is based on selection of a communication type, the wireless communication device usage trend data, wireless link quality for available communication paths with a wireless communication device associated with a recipient; and the application processor selecting at least one preferred communication path between at least one wireless communication device associated with the user and at least one wireless communication device associated with the recipient based on comparison of end-to-end quality scores.

2. The system of claim 1, wherein the application processor further selects at least one preferred wireless communication device associated with the user for the selected communication type based on the end-to-end quality scores for that wireless communication device and wireless communication device usage trend data.

3. The system of claim 2, further comprising:
the application processor initiates the selected communication type with the preferred communication device associated with the recipient.

4. The system of claim 1, further comprising:
the wireless adapter receives selection of a preferred wireless communication device associated with the recipient for the selected communication type; and
the application processor selecting at least one preferred communication path between at least one wireless communication device associated with the user and the preferred wireless communication device associated with the recipient.

5. The system of claim 1, further comprising:
the application processor initiates the selected communication type on the preferred communication path.

6. The system of claim 1, wherein the application processor further determines the end-to-end quality score based on device battery states for one or more available wireless communication devices.

7. The system of claim 1, wherein the application processor further determines the end-to-end quality score based a wireless communication device preference score derived from wireless communication device usage trend data.

8. A computer implemented method comprising:
receiving wireless communication device usage trend data for a plurality of available wireless communication devices associated with a recipient;
detecting, via an application processor executing instructions for a pan device communication optimization agent, a plurality communication paths with the plurality of wireless communication devices associated with the recipient;
determining an end-to-end quality score for a wireless communication device associated with a user, wherein the end-to-end quality score is based on selection of a communication type, the wireless communication device usage trend data, wireless link quality for available communication paths with the wireless communication devices associated with the recipient; and
selecting at least one preferred communication path between the wireless communication device associated with the user and at least one wireless communication device associated with the recipient based on comparison of end-to-end quality scores.

9. The method of claim 8, further comprising:
initiating the selected communication type on the preferred communication path.

10. The method of claim 8, further comprising:
initiating the selected communication type with the at least one preferred communication device associated with the recipient.

11. The method of claim 8, further comprising:
selecting at least one preferred wireless communication device associated with the user for the selected communication type based on end-to-end quality scores for a plurality of wireless communication devices associated with the user.

12. The method of claim 8, wherein the application processor further determines the end-to-end quality score based a power weight score derived from device battery states for one or more available wireless communication devices.

13. The method of claim 8, wherein the application processor further determines the end-to-end quality score based on wireless communication device usage trend data including frequency of use of available wireless communication devices associated with a recipient for the selected communication type.

14. An information handling system comprising:
a wireless adapter to communicate with a wireless link to receive wireless communication device usage trend data for a plurality of available wireless communication devices associated with a recipient;
a storage device to store the wireless communication device usage trend data for the plurality of available wireless communication devices associated with a user;
an application processor executing instructions for a pan device communication optimization agent to detect a plurality communication paths with the plurality of wireless communication devices associated with the recipient;
the application processor determining an end-to-end quality score for a plurality of available communication paths between wireless communication devices associated with the user and the wireless communication devices associated with the recipient, wherein the end-to-end quality score is based on selection of a communication type, the wireless communication device usage trend data, wireless link quality for with the available wireless communication paths; and
a display device presenting an advisory graphical user interface presenting the end-to-end quality ratings for the plurality of available communication paths.

15. The system of claim 14, further comprising:
the display device presenting an advisory graphical user interface presenting the end-to-end quality ratings further enabling a user to select at least one communication path between at least one wireless communication device associated with the user and at least one wireless communication device associated with the recipient.

16. The system of claim 14, further comprising:
the application processor initiates the selected communication type on the preferred communication path.

17. The system of claim 14, further comprising:
the application processor records a user selection of at least one communication path between at least one wireless communication device associated with the user and at least one wireless communication device associated with the recipient via the advisory graphical user interface presenting the end-to-end quality scores in the wireless communication device usage trend data.

18. The system of claim 14, wherein the application processor further determines the end-to-end quality score based on device battery states for one or more available wireless communication devices.

19. The system of claim 14, wherein the application processor further determines the end-to-end quality score for communication paths based on a wireless communication device preference score derived from wireless communication device usage trend data including frequency of use of available wireless communication devices associated with a recipient for the selected communication type.

20. The system of claim 14, wherein the application processor further determines the end-to-end quality score for communication paths based on service cost of the communication paths.

* * * * *